United States Patent [19]
Browning

[11] 3,795,855
[45] Mar. 5, 1974

[54] MAGNETIC RESONANCE PROBE SYSTEM

[75] Inventor: Gordon D. Browning, Castro Valley, Calif.

[73] Assignee: The Cyclotron Corporation, Berkeley, Calif.

[22] Filed: Dec. 8, 1971

[21] Appl. No.: 206,074

[52] U.S. Cl. .............................................. 324/.5 R
[51] Int. Cl. ......................................... G01n 27/78
[58] Field of Search .............. 324/.5 R, .5 A, .5 AH

[56] References Cited
OTHER PUBLICATIONS

E. R. Andrew–Nuclear Magnetic Resonance–Cambridge Press–1955, pp. 40–49.

*Primary Examiner*—Michael J. Lynch

[57] ABSTRACT

A magnetic resonance probe system having an impedance bridge wherein a sample containing coil forms one leg of the bridge and is positioned in a magnetic field for producing resonance in the sample; an RF generator connected to bridge input terminals for exciting the sample; and means differentially comparing the potentials at the midpoint or null terminals.

11 Claims, 7 Drawing Figures

MAGNETIC RESONANCE PROBE SYSTEM

The invention relates to nuclear magnetic resonance apparatus, see for example Bloch Ser. No. Re. 23,950 and article entitled "Resonance Absorption by Nuclear Magnetic Moments in a Solid" by Purcell, Torrey and Pound, *Physical Review*, Volume 69, page 37.

In brief, a material sample is placed in a magnetic field. Nuclei with spin quantum numbers and magnetic moments other than zero are known to absorb radio frequency energy at unique resonant frequencies proportional to the magnetic field strength impressed across them. This phenomenon is known as "nuclear magnetic resonance," abbreviated NMR. The frequency at which nuclear magnetic resonance occurs is determined by the magnetic field strength and the gyromagnetic ratio, which is unique for each type of nucleus. For a given sample nucleus and a given value of magnetic field strength, nuclear magnetic resonance occurs over a definite frequency range, usually in the radio frequency region for nuclear spins, and microwave frequency for electronic spins.

If an RF field is established normal to the DC field, all nuclei can be forced into the same phase sequence when the imposed RF frequency is at the magnetic resonance of the sample. At this frequency, the sample will absorb RF power. The variables may be the sample, the strength of the DC field, and the frequency of the RF power excitation. The system may therefore be used to determine desired information as to the atomic structure of the sample or for determining magnetic field strength. The apparatus disclosed in this application is of the latter type and is sometimes referred to as an NMR gaussmeter.

One of the principal problems arises out of the necessity of driving the sample with an RF excitation and at the same time being able to detect the energy absorption or transfer at resonance. Both the drive and detection loops must be coupled to the sample and, hence, excess transfer of steady state, unmodulated RF power from the power driven excitation circuit to the detector circuit is difficult to avoid. At the required sample excitation power level, such an energy transfer may saturate the RF amplification and/or detector circuit and effectively block or reduce the sensitivity of the detection circuit. One approach has been to use a single winding for both the excitation and receiving or detecting functions. This coil is usually resonance tuned with a parallel or series resonant capacitor so as to form a two-terminal network single-coil probe. The purpose for resonating the coil is to improve its sensitivity to the slight loss change due to the sample absorbing of power at resonance. Any method of tuning a coil within the probe is limited by the transmission line length between the coil and the exciter-detector unit which is desirably located out of the magnetic field and contains the passive and active elements for excitation and detection, i.e., tuning capacitor, tubes or transistors, etc. Moreover, the tuned circuit must be changed with the exciters variable frequency and is, additionally, undesirable in the introduction of microphonic tank circuit noise. It should also be noted that if the transmission line is part of the tuned circuit, the electrical length is restrictive, in practice typically less than ¼ wave length at the maximum frequency of operation without complex line compensation.

Where a two-coil system has been used, attempts have been made to eliminate or substantially reduce stray coupling between the coils which occurs at various frequencies by the use of an external adjustable phasing network that bucks out the unwanted steady-state RF at the receiver input, or by shaping the stray electrostatic field between the transmitting and receiving coils by the use of adjustable paddles. It has been found in practice that over large frequency ranges, typically 20 to 1, considerable readjusting has to be done within the range, or extremely elaborate control circuitry must be added. Usually for a good singal-to-noise ratio, the receiving coil should be series or parallel tuned, thus restricting the transmission line length as above explained.

Applicant was earlier associated in the evolving of a two-coil probe similar to that shown in FIG. 2 of the drawing where the two coils are connected to form an inductive voltage divider, one coil of which contains the sample and the other coil used as a reference. The two coils are usually wound, shielded apart, identical to each other, having a common end connection which forms the input to the receiver circuit. The excitation is applied in a balanced fashion between the opposite ends of the coils. This arrangement represented an advance in the art in that it was broad band and could be operated at all frequencies without tuning. Furthermore, the length of the transmission lines between the probe and the exciter and receiver could be kept terminated in the characteristic impedance so that much longer line lengths were possible. It was found, however, that a steady state carrier was imposed on the receiver and, at some frequencies, this carrier was sufficiently large to seriously impair the sensitivity of the receiver when optimally exciting the sample. Accordingly, while an improvement was obtained in permissible transmission line length and broader band probe response, the system still had the limitations noted.

The present magnetic resonance probe system has as its principal features and advantages substantially unlimited transmission line length; an essentially flat response across a relatively large range RF excitation frequency, typically 5–100 MHz; full use of optimum excitation power to the sample; absence of microphonics; and low standing wave ratio in the transmission line and attendant lack of interference with outside apparatus or alternatively pick up of external RF noise.

Another object of the present invention is to provide a magnetic resonance probe system of the character described which allows the use of a small probe head for insertion into the magnetic field and a long, flexible cable connecting the probe head to the portion of the unit that is to be kept out of the magnetic field, i.e., the transmitter and receiver sections of the NMR instrument.

A further object of the present invention is to provide an extremely rugged and versatile instrument having excellent stability and accuracy; high signal-to-noise ratio at all frequencies and primarily across a range of about 1 to 20 kilogauss; and permissible rapid changing of the frequency of the imposed RF excitation or slewing without required tuning of the probe.

The invention possesses other objects and features of advantage, some of which of the foregoing will be set forth in the following description of the preferred form of the invention which is illustrated inn the drawings accompanying and forming part of this specification. It is to be understood, however, that variations in the showing made by the said drawings and description may be adopted within the scope of the invention as set forth in the Claims.

Referring to said drawings.

Figure 1:
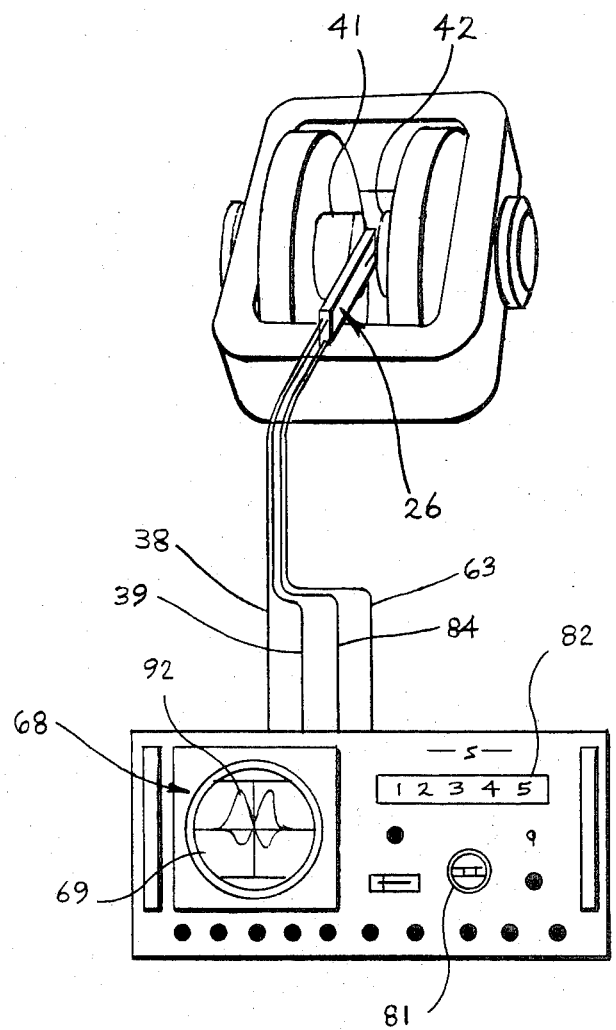
FIG. 1 is a pictorial view of the magnetic resonance probe system of the present invention and its associated apparatus.

The magnetic resonance probe system of the present invention comprises briefly a bridge having a sample containing coil L1 adapted for positioning in a magnetic field B producing resonance in the sample and a second coil L2 having one end 11 connected to one end 12 of coil L1 to provide a mid-point terminal 13 of a voltage divider, the opposite ends 16 and 17 of the coils providing input RF excitation terminals for the divider; a second voltage divider having impedance sections or legs L3 and L4 connected to provide a mid-point terminal 18 for the second voltage divider and opposite input RF excitation terminals 21 and 22; RF excitation means (generator 24) connected to the aforementioned input terminals of the two voltage dividers; and means 24 comparing the potentials at the mid-point terminals 13 and 18. Preferably and as a feature of the present invention, the impedance legs L3 and L4 are inductance coils matching L1 and L2, and additionally, the four coils are wound and mounted and shielded to provide identical electrical characteristics so that the probe presents a four-coil balanced bridge configuration.

Figure 2:
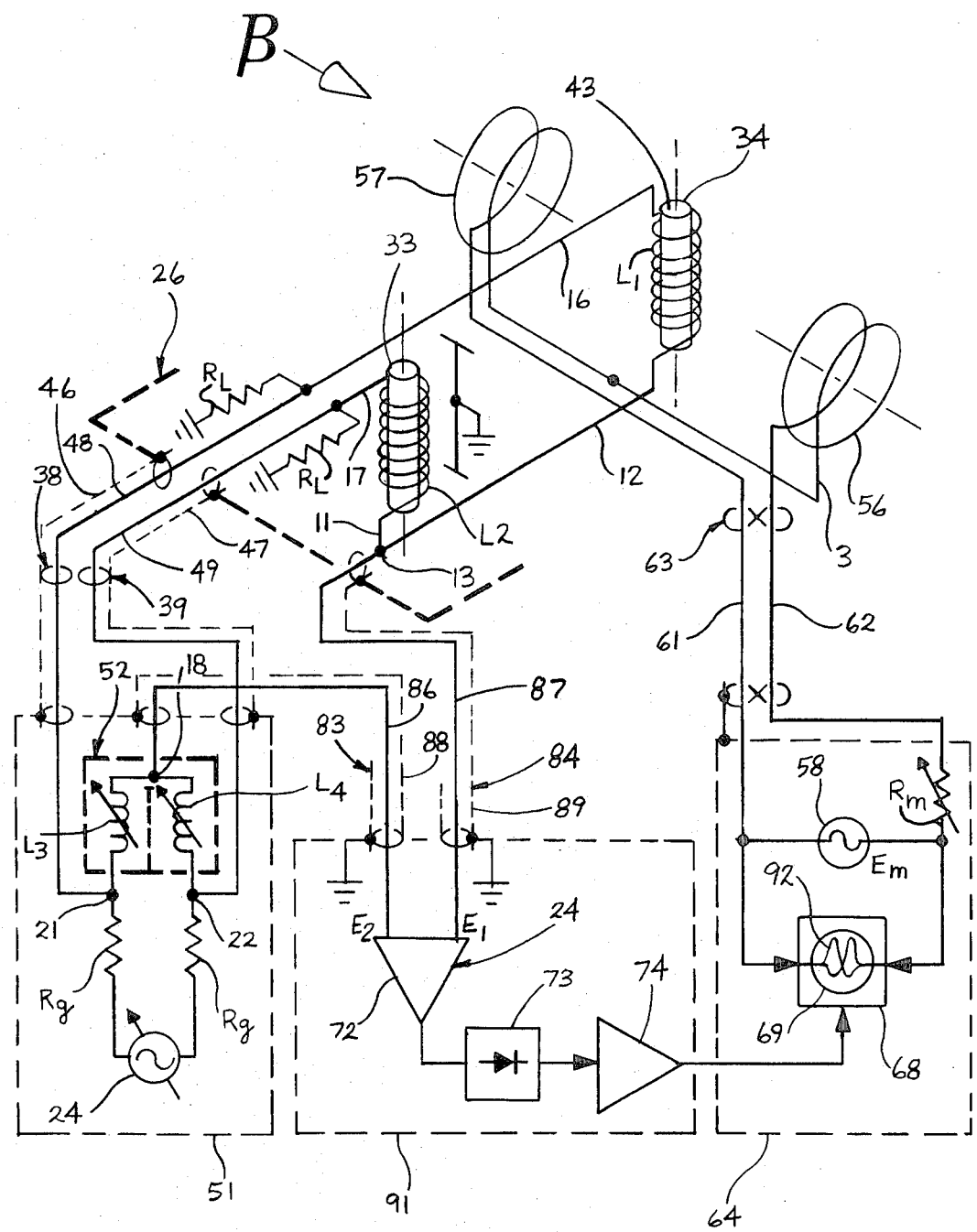
FIG. 2 is a diagrammatic representation of the probe system.
Figure 3:
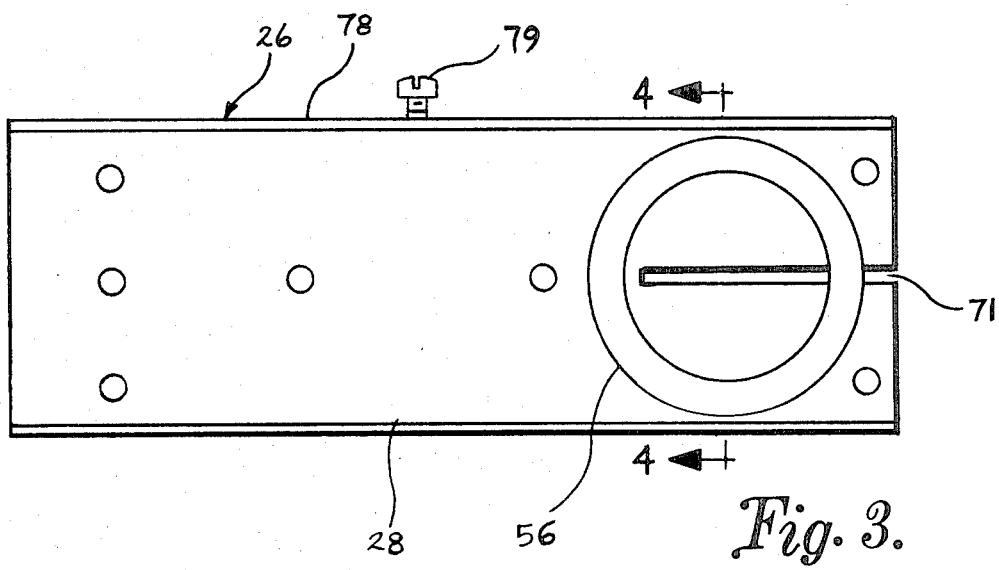
FIG. 3 is a side elevation of the probe body.
Figure 4:
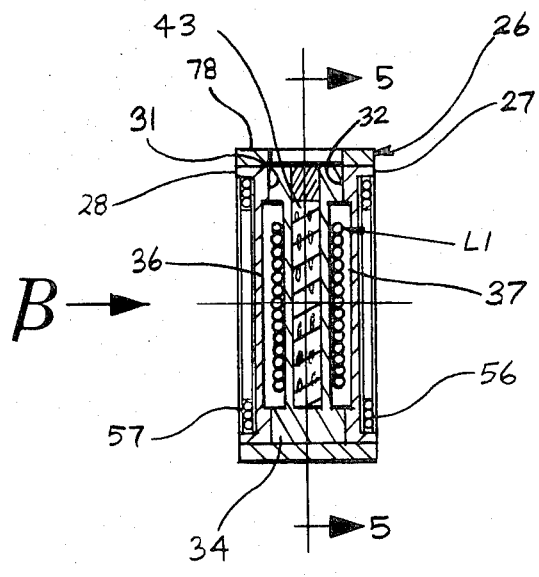
FIG. 4 is a cross sectional view taken substantially on the plane of line 4—4 of FIG. 3.

Conveniently, two or all four of the coils L1-L4 may be mounted in a probe body 26 made of non-magnetic, electric conducting material, such as brass or aluminum, with the body being formed of two half sections 27 and 28 which are formed with opposed recesses 31 and 32 for fitting around and clamping in place the cylindrical form coils 33 and 34, as seen in the embodiment of the invention depicted in FIG. 2. Moreover, the half sections are formed with central cavities 36 and 37 which enclose the coils L1 and L2. Thus, L1 and L2 may be formed and mounted to provide identical electrical characteristics.

As another feature of the present system, flexible coaxial transmission lines 38 and 39 of substantially equal length and electrical characteristics are used to connect generator 24 to the input ends 16 and 17 of the L1-L2 voltage divider. The transmission lines 38 and 39 may be of any convenient length, say 8 to 10 feet. The probe itself may be made quite small, typically 1-¼ inches by 3 inches by ½ inch for convenient positioning within the magnetic field B, that is in the gap between the opposed pole faces 41 and 42, see FIG. 1. Coil form 34 may be fashioned as a vial for containing the material sample 43.

Fashioning of body 26 of non-magnetic electric conducting material provides both shielding for coils L1 and L2, and also a reference ground to which the shields 46 and 47 of coaxial cables 38 and 39 may be terminated. To provide a constant (unity standing wave ratio) RF voltage response across the complete frequency range, each transmission line 48 and 49 of coaxial cables 38 and 39 is terminated in a resistive load RL. Since RL is effectively in parallel with L1 and L2, the inductive reactance is kept large (say ten times or more) compared to the value of RL and, therefore, the impedance of lines 48 and 49. Satisfactory results have been obtained using a characteristic impedance of 50 ohms for the transmission lines where RL equals approximately 50 ohms. RF generator 24 is mounted in a similar shielded housing 51 providing a reference ground to which the opposite ends of shields 46 and 47 are terminated. The resistances Rg, the internal resistance of generator 24, are shown to represent a balanced line-to-line source resistance.

Figure 6:
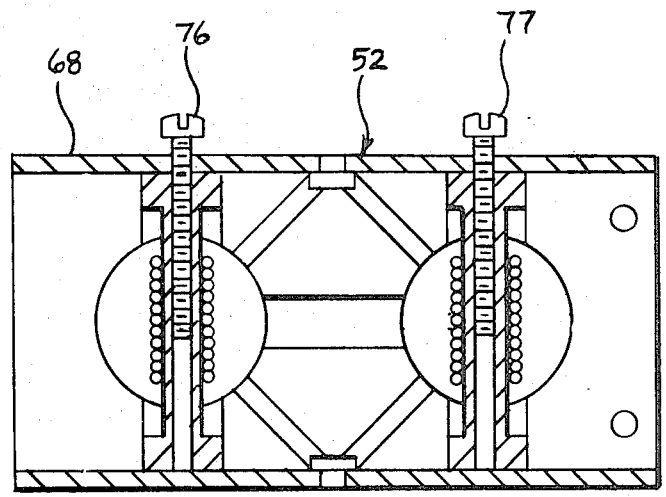
FIG. 6 is a longitudinal sectional view of the housing for a second pair of coils forming part of the probe system.
Figure 7:
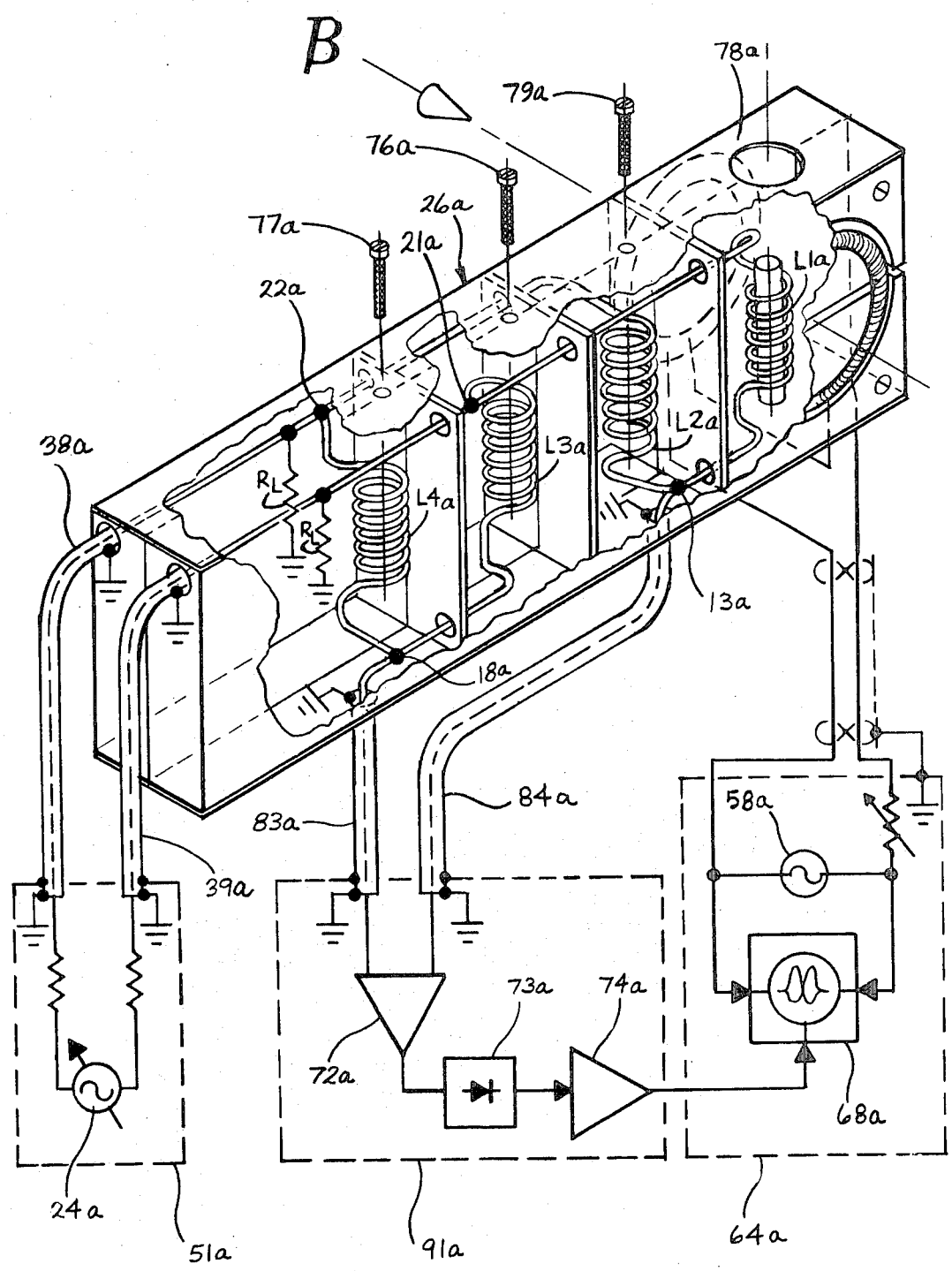
FIG. 7 is a diagrammatic representation of a modified form of the invention.

Coils L3 and L4 are preferably mounted in a housing 52 depicted in FIG. 6 and schematically in FIG. 2 and which has essentially the same geometry and composition as housing 26 so as to provide identical mounting and shielding of the coils. In the form of the invention illustrated in FIG. 2, housing 52 may be located within the transmitter housing 51.

As a further feature of the present construction, a pair of field modulation coils 56 and 57 are carried by body 28 on opposite sides of sample containing coil L1, coils 56 and 57 being wound with coincident field producing axes normal to and substantially intersecting the axis of coil L. This arrangement places sample 43 in the center of the resultant modulated DC field. Coils 56 and 57 constitute a pair of balanced helmholtz type coils which are used to incrementally sweep or modulate the unknown DC magnetic field B. These coils are series connected and are driven by a low-frequency alternating current source 58 usually set between 50 and 200 Hz. Source 58 is here shown as a voltage generator which is connected in series with an adjustable current limiting resistance, rheostat Rm, and coils 56 and 57. The transmission line connecting the generator 58 and rheostat Rm to these coils may comprise a shielded twisted pair having internal conductors 61 and 62 and an external shield 63 terminated at the probe body 26 and housing 64 for the generator 58. The electrical output Em of generator 58 is used to drive the horizontal deflection of oscilloscope 68 so that the horizontal display on the CRT 69 is kept in phase with the modulation current. Rm adjusts the amount of modulating flux for NMR observation, usually between 1 to 20 times the natural line width of the sample where the horizontal deflection of the CRT display is usually 100 percent swept by Em directly. Modulation is used when searching for resonance response in an unknown field, the narrow energy absorption band width making it difficult to otherwise tune oscillator 24 to resonance. The modulating field has the effect of scanning a small range of magnetic field centered around the applied magnetic field. To avoid eddy currents that would otherwise be set up by low frequency modulation coils 56 and 57, the portion of body 26 is formed with a narrow slot 71 traversing the interior of the coils 56 and 57 for the greater part of their diameter.

The means for differentially comparing the potentials at mid-point terminals 13 and 18 here comprise a broad band RF differential amplifier 72; a detector 73 connected to amplifier 72; a detected signal amplifier 74 connected to the detector; and oscilloscope 68 having its vertical display circuit connected to amplifier 74. Mid-terminals 13 and 18 are connected to the input terminals of amplifier 72 by coaxial lines 83 and 84 having center conductors 86 and 87 and shields 88 and 89 terminated at receiver housing 91, transmitter housing 51 and probe housing 26. Amplifier 74 should have a band pass of approximately 300 to 3,000 Hz. In this application, coils L3 and L4 become a balancing or reference inductive divider which provides an RF signal voltage E2 at one input of operational amplifier 72. Similarly, coils L1 and L2 provide an RF signal voltage E1 at the other input to amplifier 72. Any phase or amplitude difference between E1 and E2 is amplified by differential amplifier 72 and causes a corresponding output from detector 73. This output from detector 73 will result in a DC voltage (offset) when a steady state RF carrier difference occurs between E1 and E2. In this case, if E1 is amplitude modulated, detector 73 also produces a corresponding AC signal output at the resultant side band or modulation frequency. For the type of NMR observation described here, the shape of this response falls within (although not limited to) the band pass of 300 to 3,000 Hz which is then amplified and displayed vertically on CRT 69.

Voltage E2 may be considered as a tracking voltage with respect to voltage E1, that is, at all frequencies E2 will be equal to or bear a fixed relationship to voltage E1. In keeping with this arrangement, the differential amplifier used has a constant differential gain at all frequencies and suitable common mode rejection. Voltage E2 may be inverted, as by using a transformer, in which case a summing amplifier, rather than a differential amplifier, would be used. Under the circumstances, E2 will essentially offset E1 thereby leaving the imbalance voltage in divider L1-L2 to be impressed upon the operational amplifier, this imbalance voltage being a function of the absorption of energy by the sample at resonance. What is cancelled out is a portion or all of the steady state RF carrier, leaving the modulated component (side band) of voltage E1. Some small carrier voltage may be desirable for biasing the detector into its most sensitive square-law region.

As will be understood, the present system accomplishes the various advantages mentioned herein by the provision of a second divider network L3-L4 which is constructed to provide substantially identical electrical characteristics to the excitation and receiver coils L1 and L2 so as to maintain the balanced bridge configuration. The second divider network L3-L4 is preferably inductive but may also be any equivalent reactive or combination reactive-resistive circuit. Where coils L3 and L4 are used, as here shown, they may be made adjustable so as to bring about their electrical identity to coils L1 and L2 by inserting into the cores of L3 and L4 permeability changing slugs 76 and 77, here comprising brass screws threadably carried by a top plate 68 of housing 52 in axial alignment with coils L3 and L4. The inductance of coil L2 may be similarly adjusted by screw 79 into proper phase and voltage amplitude. Further balancing may be obtained in certain instances by the placing of a material sample, the same as used at 43, within coil L3.

The present instrument has been designed for operation with a single probe over a field range of from about 1 to about 20 kilogauss. RF generator 24 is designed for a corresponding continuous wave RF frequency range, the output frequency being set by a manual control dial 81. Dial 81 may be calibrated for direct readout of magnetic field intensity in kilogauss. Additionally, a frequency counter 82 may be provided at the control unit for direct readout of field measurements in gauss.

Figure 5:
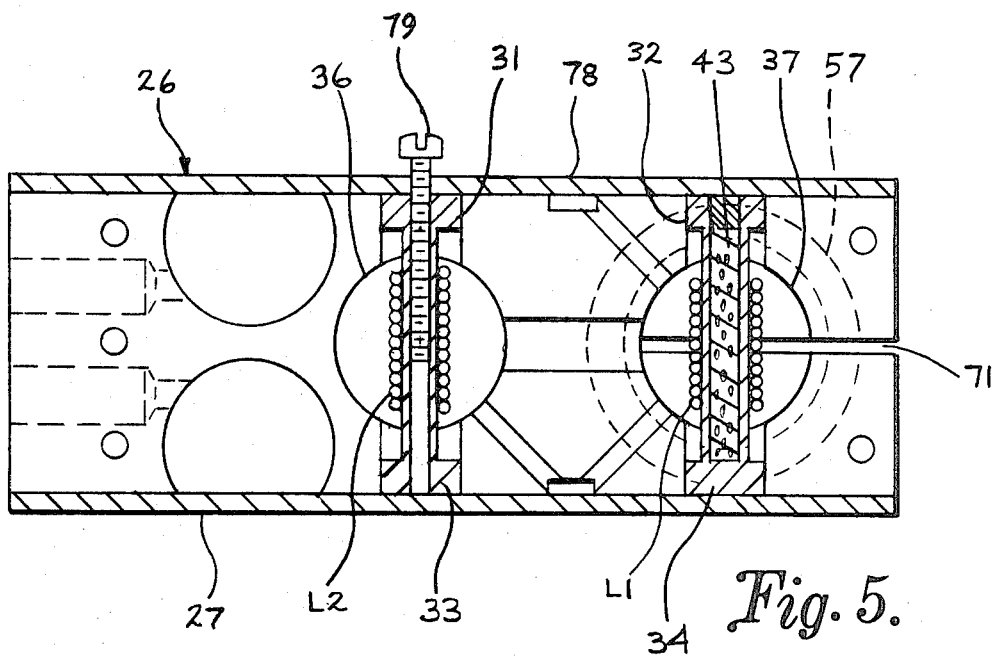
FIG. 5 is a cross sectional view taken on the plane of line 5—5 of FIG. 4.

As will be observed from FIG. 2, coils L1 and L2 are supported in the probe body 26 in spaced, substantially parallel position with their axes normal to field B with portions of the body lying between and shielding the coils one from the other. An identical housing support is provided for coils L3 and L4, as above noted, only in the form of the invention illustrated in FIG. 2, these coils are located outside of the magnetic field. A modified form of the invention is illustrated in FIG. 5, wherein all four coils L1a, L2a, L3a and L4a are mounted in the probe body 26a with all of the coils in spaced, substantially parallel position with their axes normal to the magnetic field; and with portions of the body positioned between and shielding the individual coils. In this case, all of the excitation and mid-point (null) terminals 21a, 22a and 13a, 18a are located within body 26a; and coaxial transmission lines 38a and 39a extend from generator 24a and its housing 51a to the excitation terminals 21a and 22a and housing 26a. In this embodiment, also, coaxial line 83a extends from amplifier 72a and receiver housing 91a to mid-point terminal 18a and probe housing 26a. In other respects, the components and their connections (as denoted in certain instances by the same reference numeral with subscript a added) in this embodiment are the same as in the first described embodiment.

OPERATION AND SUMMARY

The probe head 26 containing the known material sample 43 is positioned in the unknown field B, as illustrated in FIG. 1. The untuned probe and other electrical characteristics of the system permit rapid tuning or slewing of the generator 24 to an excitation frequency where a "blip" 92 appears on the CRT 69. When the excitation frequency is correctly set to correspond to the unknown field B, the sample is said to be in resonance with the field. Each time the field is swept across the resonant line width of the sample, the sample absorbs RF power from L1, upsetting the equal voltage division between L1 and L2 and producing a modulated RF offset at mid-point terminal 13 producing a modulation of E1 at the input to amplifier 72. The resultant side band is amplified and detected at 73 and amplified at 74 to produce a corresponding "blip" or "burst" as displayed vertically by CRT 69, each time the field is swept across the resonant point. When the CRT display is centered horizontally, field B can be determined from the excitation frequency Fo as follows:

For proton resonance,

B (in gauss) = Fo (in Hz)/4.2577 a constant

The range commonly used for gaussmeters is from about 1 to about 20 kilogauss or 4.26–85.2 Mhz.

For protons, the sample 43 may comprise mineral oil or water where the water normally has a small amount of paramagnetic salt for broadening the resonant line width.

As a preferred scheme, as stated above, the inductors L1, L2, L3 and L4 are (initially) made equal to each other. Furthermore, all distributed capacitances, inductances and losses associated with these inductors should be the same (i.e., balanced). This requires that both transmission lines 38 and 39 are of equal lengths and have the same electrical characteristics. The receiver lines 83 and 84 are also the same electrically, but are so trimmed in length to provide the same phase shift (at all operating frequencies) between E1 and E2.

As one can see, if E1 and E2 are perfectly cancelling (at any given frequency), there will be no steady state RF carrier amplified by the RF differential amplifier 72. Under such conditions, only the side bands produced by the sample resultant resonance modulation will be amplified and detected. Accordingly, large amounts of RF voltage can be used to drive the probe-coil system without over-driving the differential RF amplifier 72 or to saturate the detector 73, assuming that the RF differential amplifier has a sufficient common mode signal or individual input signal capability.

I claim:

1. A magnetic resonance probe system comprising:
    a bridge having a sample containing first coil adapted for positioning in a magnetic field producing resonance in the sample and a second coil having one end connected to one end of said first coil to provide a mid-point terminal of a first voltage divider, the opposite ends of said coils providing input RF excitation terminals for said divider, and a second voltage divider having third and fourth impedance legs connected to provide a midpoint terminal for said second voltage divider and opposite input RF excitation terminals,
    said first and second coils having substantially identical electrical characteristics and said impedance legs comprising third and fourth coils of substantially identical electrical characteristics to said first and second coils and being connected thereto in a four coil balanced bridge configuration;
    a probe body supporting said first and second coils and being adapted for positioning in said magnetic field;
    RF excitation means including a remote RF generator;
    flexible coaxial transmission lines of substantially equal length and electrical characteristics connecting said generator to the input RF excitation terminals; and
    means differentially comparing the potentials at said mid-point terminals.

2. A probe system as defined in claim 1, said body being formed of non-magnetic electric conducting material and providing a reference ground; and
    a resistive load connected to the probe terminal end of each of said transmission lines and said body.

3. A probe system as defined in claim 2, said resistive loads having a value less than one-tenth of the inductive reactance at said input terminals.

4. A probe system as defined in claim 2, said generator providing a reference ground;
    a resistive load connected to the generator end of each of said transmission lines and said last named reference ground; and
    said coaxial lines having shields connecting said reference grounds.

5. A probe system as defined in claim 1, said body being formed of non-magnetic electric conducting material to provide substantially identical electrostatic shielding for said first and second coils; and
    a similar body providing substantially identical shielding of said third and fourth coils.

6. A probe system as defined in claim 1, said body supporting said first and second coils in spaced substantially parallel position with their axes normal to said field;
    field modulation coils carried by said body on opposite sides of said first coil with coincident field producing axes normal to and substantially intersecting the axis of said first coil; and
    an alternating current source connected to said field modulation coils for modulating said field.

7. A probe system as defined in claim 6, said means comprising:
    an RF differential amplifier;
    a detector connected to said amplifier;
    a detected signal amplifier connected to said detector; and
    an oscilloscope connected to said last named amplifier for displaying said detected signal, the horizontal sweep circuit of said oscilloscope being connected to said alternating current source.

8. A probe system as defined in claim 6, said body being formed of a non-magnetic electric conducting material providing electrostatic shielding for said first and second coils and being formed with a slot traversing the interior of said field modulation coils for minimizing eddy currents in said body induced by said field modulation coils.

9. A probe system as defined in claim 5, and means carried by said last named body and adjustably positionable relative to at least one of said third and fourth coils to adjust the permeability thereof.

10. A probe system as defined in claim 8, said similar body being mounted adjacent said generator; and
    said transmission lines connecting the input terminals of said first and second coils to the input terminals of said third and fourth coils.

11. A probe system as defined in claim 8, said body supporting said third and fourth coils adjacent to and substantially parallel with said first and second coils with the axes of said third and fourth coils located within and normal to said field;
    said coils being connected to position said input terminals at said body; and
    said transmission lines extending from said input terminals to said remote located RF generator.

* * * * *